US012688961B2

(12) United States Patent
Chen et al.

(10) Patent No.: US 12,688,961 B2
(45) Date of Patent: Jul. 21, 2026

(54) OPTICAL ELEMENT DRIVING MECHANISM

(71) Applicant: Actutek Corporation, Taoyuan City (TW)

(72) Inventors: Yi-Ho Chen, Taoyuan City (TW); Ya-Hsiu Wu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 533 days.

(21) Appl. No.: 17/970,846

(22) Filed: Oct. 21, 2022

(65) Prior Publication Data

US 2023/0132120 A1      Apr. 27, 2023

Related U.S. Application Data

(60) Provisional application No. 63/270,806, filed on Oct. 22, 2021.

(51) Int. Cl.
H01F 7/16 (2006.01)
G02B 7/00 (2021.01)
(Continued)

(52) U.S. Cl.
CPC ............. H01F 7/081 (2013.01); G02B 7/008 (2013.01); G02B 7/02 (2013.01); G02B 7/023 (2013.01);
(Continued)

(58) Field of Classification Search
CPC . G02B 7/02; G02B 7/023; G02B 7/04; G02B 7/08; G02B 7/09; G02B 7/10; G02B 27/646; G03B 2205/0046; G03B 2205/0076; G03B 3/02; G03B 3/10; G03B 3/12; G03B 13/36; G03B 30/00; H02K 11/21; H02K 11/33; H04N 23/51; H04N 23/54; H04N 23/55; F03G 7/06143; F03G 7/06114
See application file for complete search history.

(56) References Cited

U.S. PATENT DOCUMENTS 11,194,115 B1* 12/2021 Miller ...................... G02B 7/02
2009/0295986 A1* 12/2009 Topliss ................... G02B 7/026
                                                                    396/73
(Continued)

FOREIGN PATENT DOCUMENTS

CN          112698468  A   *   4/2021

OTHER PUBLICATIONS

English language machine translation of Chen CN-112698468-A (Year: 2021).*

*Primary Examiner* — Marin Pichler
(74) *Attorney, Agent, or Firm* — MUNCY, GEISSLER, OLDS & LOWE, P.C.

(57) ABSTRACT

An optical element driving mechanism includes a fixed portion, a movable portion, a driving assembly, and a limiting assembly. The movable portion is connected to an optical element with an optical axis, and is movable relative to the fixed portion. The driving assembly drives the movable portion to move relative to the fixed portion. The limiting assembly is disposed on the movable portion and is connected with the driving assembly. The driving assembly is limited to move within a movable range relative to the fixed portion by the limiting assembly.

18 Claims, 7 Drawing Sheets

(51) Int. Cl.

| | |
|---|---|
| *G02B 7/02* | (2021.01) |
| *G02B 7/04* | (2021.01) |
| *G02B 7/08* | (2021.01) |
| *G02B 27/64* | (2006.01) |
| *G03B 9/14* | (2021.01) |
| *H01F 7/08* | (2006.01) |
| *H04N 23/51* | (2023.01) |
| *H04N 23/54* | (2023.01) |
| *H04N 23/55* | (2023.01) |

(52) U.S. Cl.
CPC ................. *G02B 7/04* (2013.01); *G02B 7/08* (2013.01); *G02B 27/646* (2013.01); *G03B 9/14* (2013.01); *H01F 7/16* (2013.01); *H04N 23/51* (2023.01); *H04N 23/54* (2023.01); *H04N 23/55* (2023.01)

(56) References Cited

U.S. PATENT DOCUMENTS

| | | | | |
|---|---|---|---|---|
| 2011/0107758 A1* | 5/2011 | Kotanagi | ................. | G03B 3/10 |
| | | | | 60/528 |
| 2017/0299945 A1* | 10/2017 | Suzuki | ................... | G03B 13/36 |
| 2020/0073200 A1* | 3/2020 | Eom | ....................... | G03B 5/00 |
| 2021/0156367 A1* | 5/2021 | Howarth | ............. | F03G 7/06143 |

* cited by examiner

PL2

OPTICAL ELEMENT DRIVING MECHANISM

CROSS-REFERENCE TO RELATED APPLICATIONS

The present application claims priority to U.S. Provisional Patent Application No. 63/270,806, filed Oct. 22, 2021, which are incorporated by reference herein in their entirety.

BACKGROUND OF THE DISCLOSURE

Field of the Disclosure

The present invention relates to a driving mechanism, and more particularly to an optical element driving mechanism.

Description of the Related Art

The design of today's electronic devices is continually moving toward miniaturization, so that various elements or structures of optical modules used in such applications as imaging must be continuously reduced in size in order to achieve miniaturization. Therefore, how to design a miniature driving mechanism has become an important issue.

BRIEF SUMMARY OF THE DISCLOSURE

An embodiment of the invention provides an optical element driving mechanism including a fixed portion, a movable portion, a driving assembly, and a limiting assembly. The movable portion is connected to an optical element with an optical axis, and is movable relative to the fixed portion. The driving assembly drives the movable portion to move relative to the fixed portion. The limiting assembly is disposed on the movable portion and is connected with the driving assembly. The driving assembly is limited to move within a movable range relative to the fixed portion by the limiting assembly.

According to some embodiments of the present disclosure, the limiting assembly includes a first limiting element and a second limiting element, wherein when viewed along a first direction parallel to the optical axis, the first limiting element and the second limiting element at least partially overlap, wherein when viewed along a second direction perpendicular to the first direction, the first limiting element and the second limiting element are symmetrically arranged, wherein when viewed along a third direction perpendicular to the first direction and the second direction, the first limiting element and the second limiting element do not overlap.

According to some embodiments of the present disclosure, the first limiting element and the second limiting element respectively have a first hook-shaped structure and a second hook-shaped structure. The first hook-shaped structure extends along the second direction and away from the optical axis, and then extends along the first direction and away from a light incident surface. The second hook-shaped structure extends along the second direction and away from the optical axis, and then extends along the first direction and close to the light incident surface. The first hook-shaped structure and the second hook-shaped structure are faced to each other.

According to some embodiments of the present disclosure, the first hook-shaped structure has a first inner surface, the second hook-shaped structure has a second inner surface, and the first inner surface and the second inner surface are faced to each other. The driving element is in contact with the first inner surface at at least one contact point, and the driving element is in contact with the second inner surface at at least one contact point. When the first hook-shaped structure is cut with a first imaginary plane and observed, a first contour of the first inner surface is an arc shape protruding toward the second inner surface, and a curvature at the contact point is smaller than a curvature at any one of two side endpoints. When the second hook-shaped structure is cut with the first imaginary plane and observed, a first contour of the second inner surface is an arc shape protruding toward the first inner surface, and a curvature at the contact point is smaller than a curvature at any one of two side endpoints. The first imaginary plane is perpendicular to the second direction and passes through the contact point of the first inner surface and the contact point of the second inner surface.

According to some embodiments of the present disclosure, a first contact surface is formed by flattening a part of the first inner surface that is arc-shaped, and the first contact surface is a plane. A second contact surface is formed by flattening a part of the second inner surface that is arc-shaped, and the second contact surface is a plane. The driving assembly is in contact with the first contact surface, and the driving assembly is in contact with the second contact surface.

According to some embodiments of the present disclosure, when the first hook-shaped structure is cut with a second imaginary plane and observed, a second contour of the first inner surface is an arc shape that is concave away from the second inner surface, and a curvature at the contact point is greater than or equal to a curvature at an outer endpoint. When the second hook-shaped structure is cut with the second imaginary plane and observed, a second contour of the second inner surface is an arc shape that is concave away from the first inner surface, and a curvature at the contact point is greater than or is equal to a curvature at an outer endpoint. The second imaginary plane is perpendicular to the third direction and passes through the contact point of the first inner surface and the contact point of the second inner surface.

According to some embodiments of the present disclosure, the optical element driving mechanism further includes a circuit assembly, disposed on a first side of the fixed portion, including a first circuit element, a second circuit element, and a third circuit element. When viewed along the first direction, the first circuit element and the second circuit element at least partially overlap, the first circuit element and the third circuit element do not overlap, and the second circuit element and the third circuit element do not overlap. When viewed along the second direction, the first circuit element, the second circuit element, and the third circuit element do not overlap. When viewed along the third direction, the first circuit element, the second circuit element, and the third circuit element at least partially overlap.

According to some embodiments of the present disclosure, the first circuit element has a first end portion, the second circuit element has a second end portion, and the third circuit element has a third end portion. When viewed along the third direction, the first end portion, the second end portion, and the third end portion at least partially overlap.

According to some embodiments of the present disclosure, the first circuit element further has an outer curved portion, the second circuit element further has an outer curved portion, and the third circuit element further has a first outer curved portion and a second outer curved portion. The outer curved portion of the first circuit element, the outer curved portion of the second circuit element, and the first outer curved portion and the second outer curved portion of the third circuit element are all curved outward away from the optical axis. When viewed along the second direction, the outer curved portion of the first circuit element and the first outer curved portion of the third circuit element are symmetrically disposed, and the outer curved portion of the second circuit element and the second outer curved portion of the third circuit element are symmetrically disposed.

According to some embodiments of the present disclosure, when viewed along the third direction, the outer curved portion of the second circuit element is further away from the optical axis than the outer curved portion of the first circuit element, and the second outer curved portion of the third circuit element is further away from the optical axis than the first outer curved portion of the third circuit element.

According to some embodiments of the present disclosure, when viewed along the third direction, the outer curved portion of the second circuit element does not overlap the first end portion and the second end portion, and the second outer curved portion of the third circuit element does not overlap the third end portion.

According to some embodiments of the present disclosure, the driving assembly includes a first driving element and a second driving element, the first driving element and the second driving element have a shape memory alloy, and the first driving element and the second driving element are elongated structures. When viewed along the first direction, the first driving element and the second driving element at least partially overlap. When viewed along the second direction, the first driving element and the second driving element do not overlap. When viewed along the third direction, the first driving element and the second driving element do not overlap. One end of the first driving element is connected to the outer curved portion of the first circuit element, and the other end is connected to the first outer curved portion of the third circuit element through the first limiting element. One end of the second driving element is connected to the second circuit element, and the other end is connected to the second outer curved portion of the third circuit element through the second limiting element.

According to some embodiments of the present disclosure, the optical element driving mechanism further includes an adhesive assembly, including a first adhesive element, a second adhesive element, a third adhesive element, and a fourth adhesive element. The first adhesive element is injected from a first side of the first limiting element to fix the first driving element and the first limiting element. The second adhesive element is injected from a second side of the first limiting element to fix the first driving element and the first limiting element. The first side of the first limiting element and the second side of the first limiting element are opposite to each other. The third adhesive element is injected from a first side of the second limiting element to fix the second driving element and the second limiting element. The fourth adhesive element is injected from a second side of the second limiting element to fix the second driving element and the second limiting element. The first side of the second limiting element and the second side of the second limiting element are opposite to each other.

According to some embodiments of the present disclosure, the optical element driving mechanism further includes a driving circuit assembly, disposed on the fixed portion, including a first input circuit element, a second input circuit element, and an output circuit element. The first input circuit element has a first connection portion, a first extension portion, and a first external connection portion, the first extension portion is connected to the first connection portion and the first external connection portion. The first connection portion is connected to the first end portion, the first external connection portion protrudes from a second side of the fixed portion and is connected to an external driving power source, wherein the second side and the first side are opposite to each other. The second input circuit element has a second connection portion, a second extension portion, and a second external connection portion, the second extension portion is connected to the second connection portion and the second external connection portions, wherein the second connection portion is connected to the second end portion, the second external connection portion protrudes from the second side and is connected to the external driving power source. The output circuit element has a third connection portion, a third extension portion, and a third external connection portion, the third extension portion is connected to the third connection portion and the third external connection portion, wherein the third connection portion is connected to the third end portion, the third external connection portion protrudes from the second side and is connected to the external driving power source.

According to some embodiments of the present disclosure, the optical element driving mechanism further includes a position sensing assembly, sensing a movement of the movable portion relative to the fixed portion, including a reference element and a position sensing element. The reference element is disposed on the movable portion, and the position sensing element is disposed on the fixed portion and connected to a sensing circuit assembly. The sensing circuit is disposed on the fixed portion and includes a plurality of circuit elements, and the circuit elements protrude from the first side of the fixed portion and are connected to an external power source.

According to some embodiments of the present disclosure, the first circuit element, the second circuit element, and the third circuit element respectively have at least one hole portion, wherein a plurality of positioning posts are disposed on the first side of the fixed portion, and the hole portions are engaged with the positioning posts.

According to some embodiments of the present disclosure, the first side of the fixed portion is provided with a plurality of groove structures, wherein the first circuit element, the second circuit element and the third circuit element are fixed on the groove structures by an adhesive element.

According to some embodiments of the present disclosure, the movable portion is formed by a combination of a first part and a second part.

According to some embodiments of the present disclosure, the first limiting element is integrally formed with the first part, and the second limiting element is integrally formed with the second part.

According to some embodiments of the present disclosure, the limiting assembly is made of non-metallic material.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
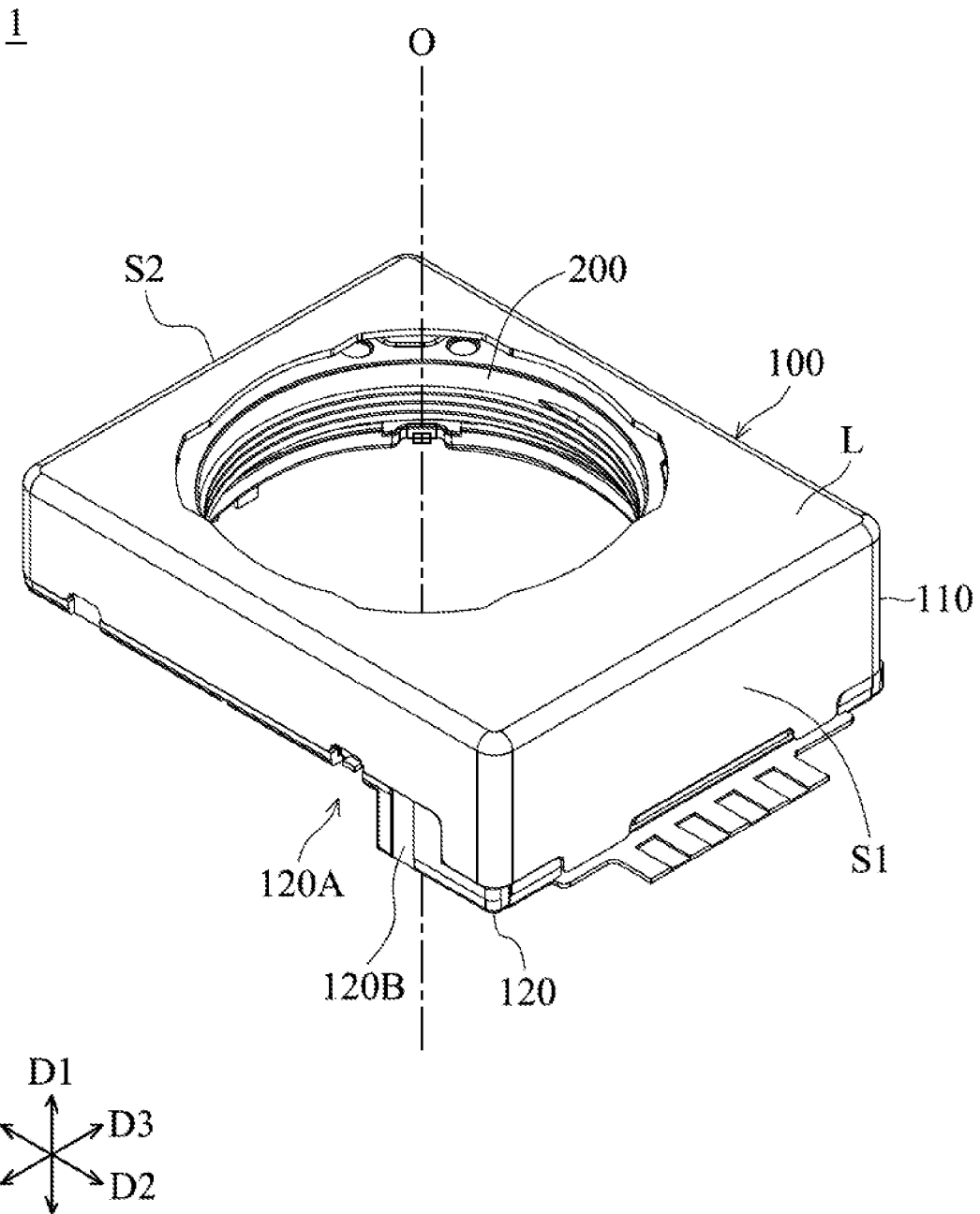
FIG. 1 is a perspective view of an optical element driving mechanism according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that when an element is referred to as being "connected to" or "coupled to" another element, the element may be directly connected or coupled to another element, or there are one or more elements between the two elements. In addition, the use of ordinal numbers such as first, second, and third does not necessarily imply a sense of order, but can be multiple instances to distinguish actions or structures.

Reference to "one embodiment" or "an embodiment" throughout the specification means that particular features, structures, or characteristics described in conjunction with the embodiment are included in at least one embodiment. Therefore, the sentences "in one embodiment" or "in an embodiment" appearing in various places throughout the specification do not necessarily all refer to the same embodiment. In addition, in one or more embodiments, specific features, structures, or characteristics may be combined in any suitable manner.

Figure 2:
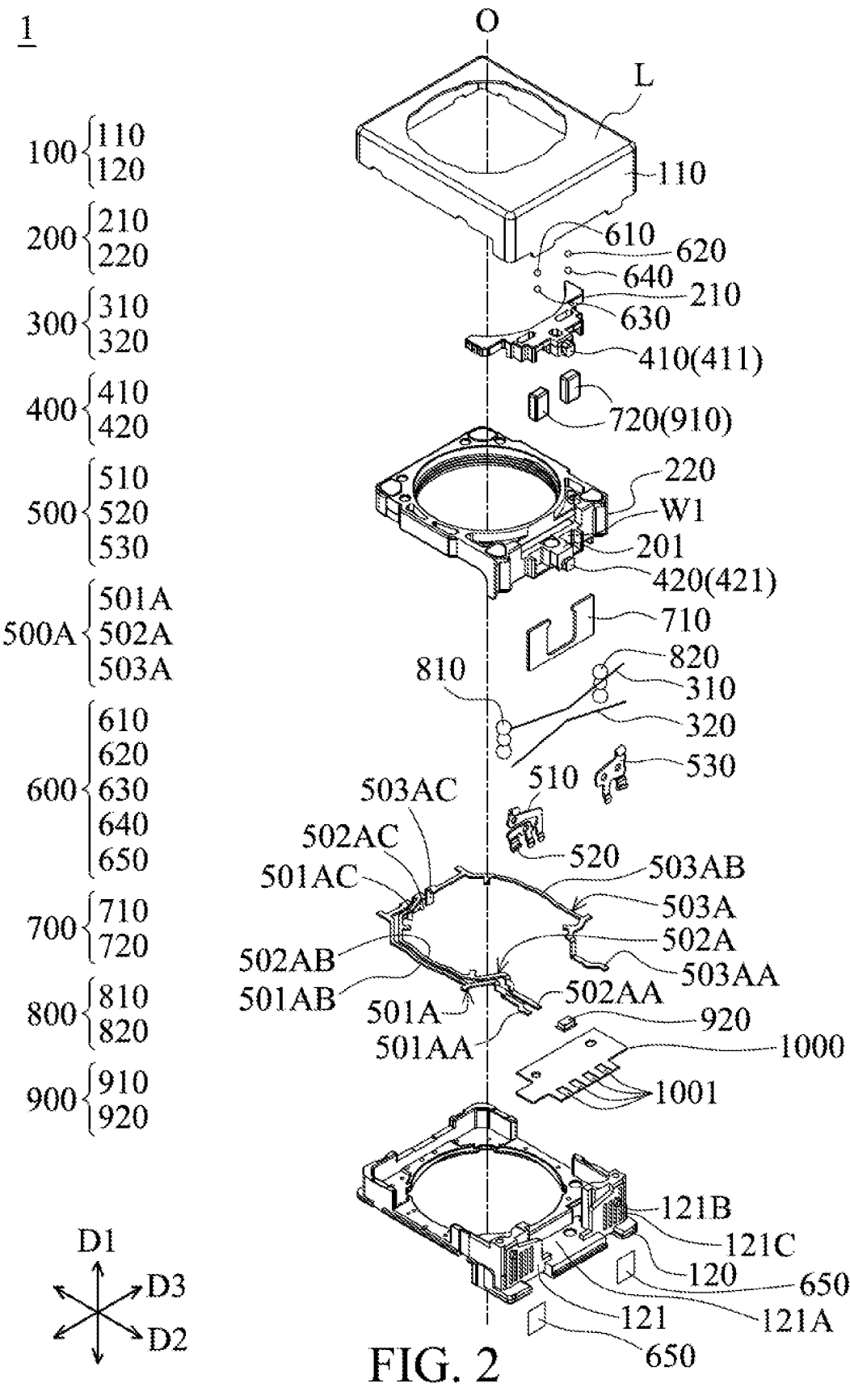
FIG. 2 is an exploded view of the optical element driving mechanism according to an embodiment of the present disclosure.
Figure 3:
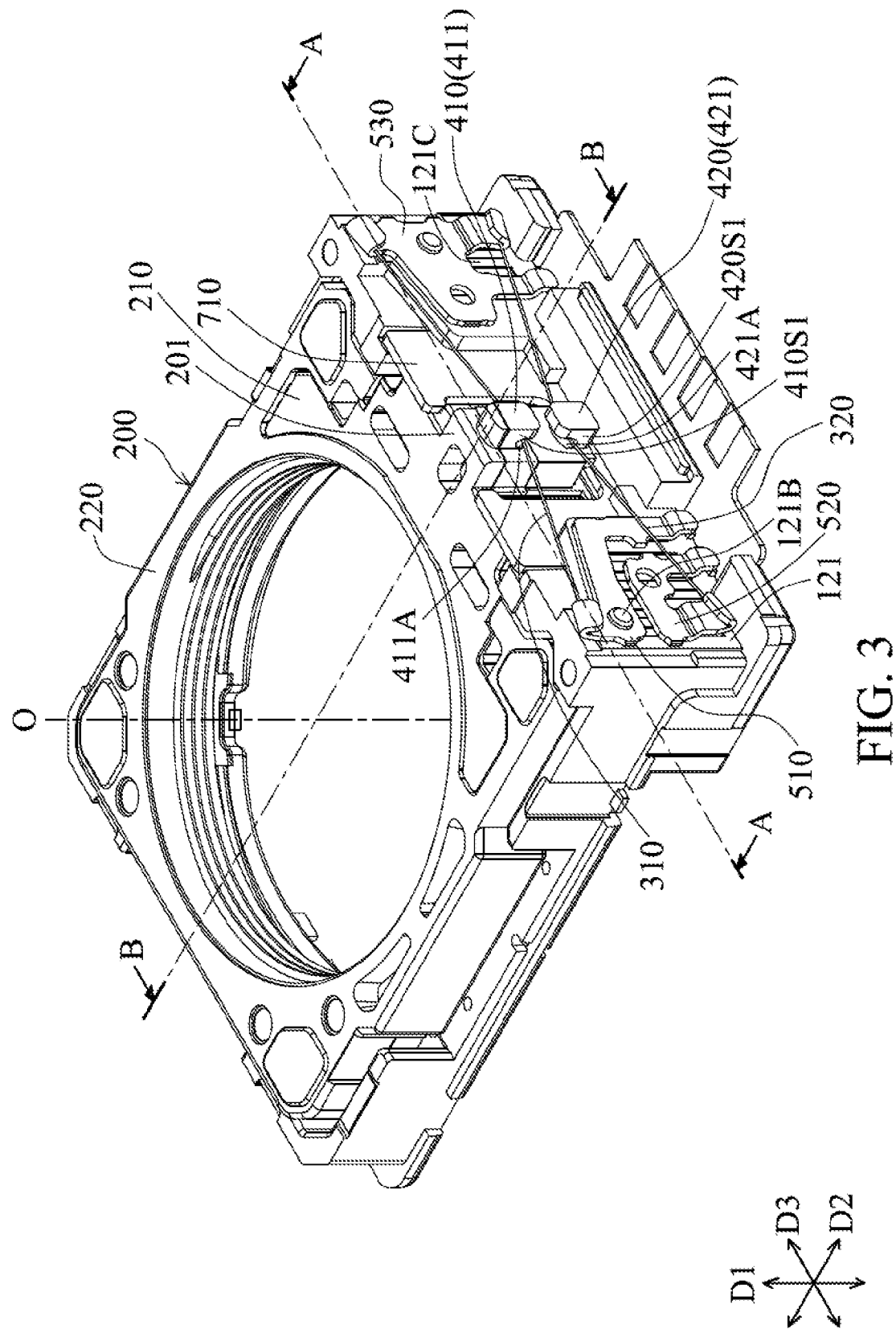
FIG. 3 is a perspective view of partial elements of the optical element driving mechanism according to an embodiment of the present disclosure.
Figure 4:
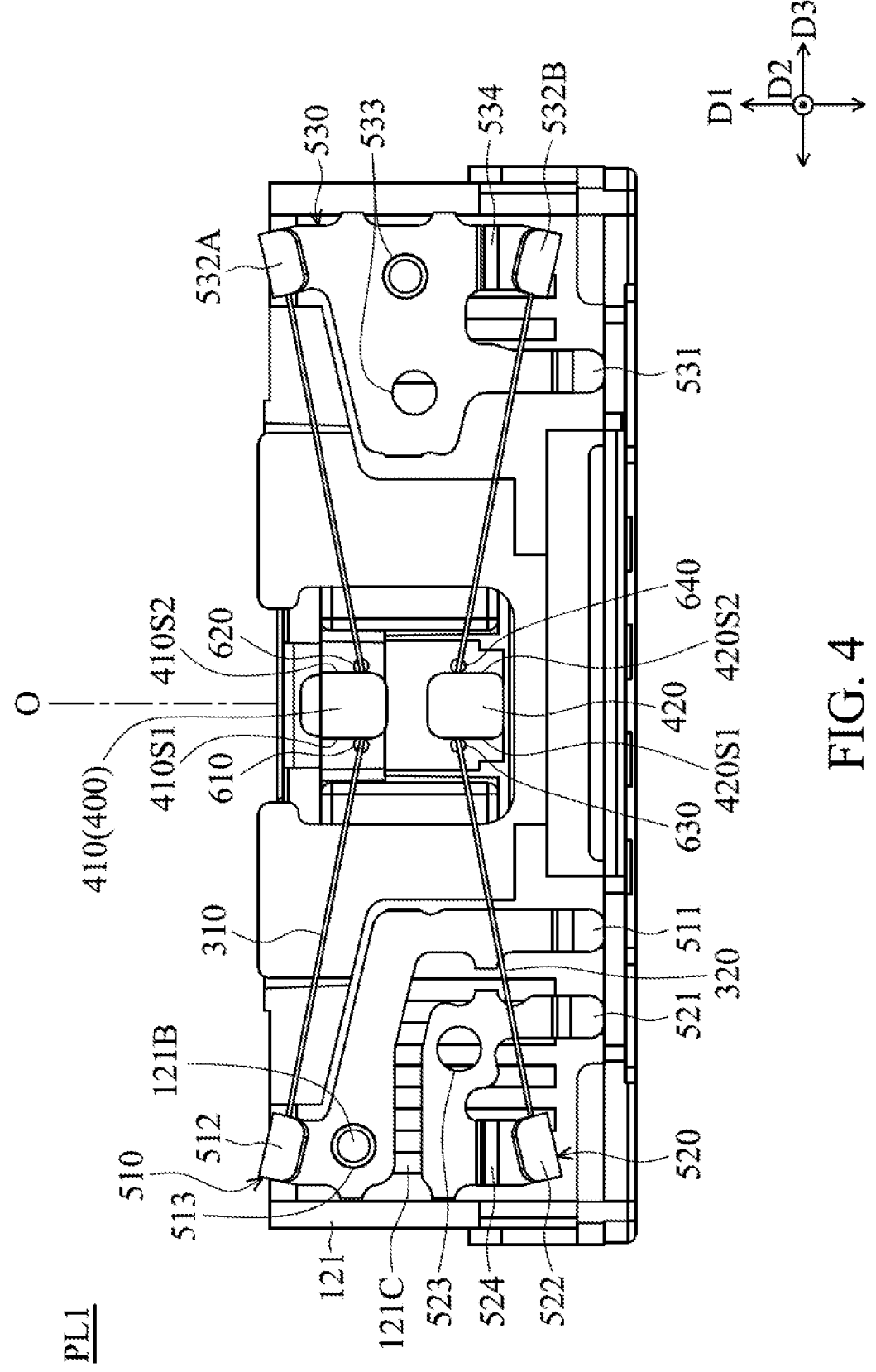
FIG. 4 is a front view of partial elements of the optical element driving mechanism according to an embodiment of the present disclosure.

First, refer to FIG. 1 to FIG. 4. FIG. 1 is a perspective view of an optical element driving mechanism 1 according to an embodiment of the present disclosure. FIG. 2 is an exploded view of the optical element driving mechanism 1 according to an embodiment of the present disclosure. FIG. 3 is a perspective view of partial elements of the optical element driving mechanism 1 according to an embodiment of the present disclosure. FIG. 4 is a front view of partial elements of the optical element driving mechanism 1 according to an embodiment of the present disclosure. FIG. 3 and FIG. 4 omit an outer cover 110 to clearly show the main elements of the optical element driving mechanism 1. The optical element driving mechanism 1 comprises a fixed portion 100, a movable portion 200, a driving assembly 300, a limiting assembly 400, a circuit assembly 500, a driving circuit assembly 500AA, an adhesive assembly 600, a magnetic assembly 700, a guiding assembly 800, a position sensing assembly 900, and a sensing circuit assembly 1000.

As shown in FIG. 1 and FIG. 2, the fixed portion 100 comprises an outer cover 110 and a base 120, and the outer cover 110 and the base 120 form a casing to protect internal elements. As shown in FIG. 1, a bottom surface of the base 120 is not completely horizontal, but has a recessed portion 120A recessed toward a light incident surface L, and a protruding portion 120B protruding away from the light incident surface L relative to the recessed portion 120A.

The recessed portion 120A may be used to accommodate an optical module (not shown), so that the optical element driving mechanism 1 is connected to the optical module. The optical module may comprise, for example, a photosensitive element receiving light from an optical element (not shown) along an optical axis O. By providing the recessed portion 120A in the base 120, a height of the optical element driving mechanism 1 may be reduced, thereby achieving the effect of miniaturization.

When viewed along a first direction D1 parallel to the optical axis O, the base 120 of the fixed portion 100 has four sides. In the following, in order to clearly describe arrangement relationships between elements, the side with the protruding portion 120B is referred to a first side S1, and a side opposite to the first side S1 is referred to a second side S2.

As shown in FIG. 2 and FIG. 3, a first blocking wall 121 is disposed on the first side S1 of the base 120 to limit a movable range of the movable portion 200. A middle part of the first blocking wall 121 is hollowed out as an accommodating portion 121A for accommodating a part of the movable portion 200 and a part of the magnetic assembly 700. The first blocking wall 121 further has a plurality of positioning posts 121B and a plurality of groove structures 121C. The positioning posts 121B are used for positioning the circuit assembly 500, and the groove structures 121C accommodate a part of the adhesive assembly 600.

The movable portion 200 is a holder, disposed between the base 120 and the outer cover 110, connected to the optical element, and movable relative to the fixed portion 100. In some embodiments, the movable portion 200 is formed by a combination of a first part 210 and a second part 220.

When viewed along the first direction D1, similar to the base 120, the movable portion 200 is substantially rectangular and has a first side wall W1 close to the first side S1 of the base 120. Moreover, the movable portion 200 has a protruding portion 201, which is protruded from the first side wall W1 and accommodated in the accommodating portion 121A of the base 120.

As shown in FIG. 2 to FIG. 4, the driving assembly 300 is disposed on the first side S1 of the base 120, driving the movable portion 200 to move relative to the fixed portion 100, comprising a first driving element 310 and a second driving element 320. The first driving element 310 and the second driving element 320 are elongated structures with shape memory alloy (SMA), which will shrink with temperature. Shrinkage of the driving assembly 300 may be controlled by supplying power to the driving element 300 to change the temperature, thus movement of the movable portion 200 may be further controlled.

When viewed along the first direction D1, the first driving element 310 and the second driving element 320 at least partially overlap. When viewed along a second direction D2 perpendicular to the first direction D1, the first driving element 310 and the second driving element 320 do not overlap. When viewed along a third direction D3 perpendicular to the first direction D1 and the second direction D2, the first driving element 310 and the second driving element 320 do not overlap.

The limiting assembly 400 is disposed on the protruding portion 201 of the movable portion 200 and is connected to the driving assembly 300. The driving assembly 300 is limited to move relative to the fixed portion 100 within a movable range. The limiting assembly 400 is made of non-metallic material. In some embodiments, the limiting assembly 400 is made of plastic. The limiting assembly 400 comprises a first limiting element 410 and a second limiting element 420. The first limiting element 410 is integrally formed with the first part 210 of the movable portion 200, and the second limiting element 420 is integrally formed with the second part 220 of the movable portion 200.

Compared with the conventional structure in which the limiting assembly made of metal material is usually attached to the movable portion, in this embodiment, the limiting assembly 400 and the movable portion 200 are integrally formed with a non-metallic material, which not only simplifies the manufacturing steps, but also reduces heat dissipation of the driving assembly due to the contact with the limiting assembly of the metal material.

When viewed along the first direction D1, the first limiting element 410 and the second limiting element 420 at least partially overlap. When viewed along the second direction D2, the first limiting element 410 and the second limiting element 420 are symmetrically disposed. When viewed along the third direction D3, the first limiting element 410 and the second limiting element 420 do not overlap.

The first limiting element 410 and the second limiting element 420 respectively have a first hook-shaped structure 411 and a second hook-shaped structure 421. The first hook-shaped structure 411 extends along the second direction D2 and away from the optical axis O, and then extends along the first direction D1 and away from the light incident surface L. The second hook-shaped structure 421 extends along the second direction D2 and away from the optical axis O, and then extends along the first direction D1 and close to the light incident surface L. That is, the first hook-shaped structure 411 and the second hook-shaped structure 421 are faced to each other.

Since the first hook-shaped structure 411 and the second hook-shaped structure 421 formed on the protruding portion 201 of the first side wall W1 of the movable portion 200 are opposite to each other, if the movable portion 200 is manufactured by integral molding, it will be more difficult and complicated to manufacture or demold, and the cost will be more expensive. Therefore, as mentioned above, in some embodiments, the movable portion 200 is formed by a combination of the first part 210 and the second part 220. In this way, the first part 210 and the second part 220 having the same hook-like structure may be easily manufactured by using the same mold with only a little change, and the movable portion 200 may be formed by easily combining the first part 210 and the second part 220.

In addition, if a height of the movable portion 200 (that is, the height along the first direction D1) or the distance between the first hook-shaped structure 411 and the second hook-shaped structure 421 needs to be changed, the required height or distance may be easily achieved by slightly changing the process steps, and may not need to redesign a new mold, which has the advantages of low cost and wide application range.

Figure 5:
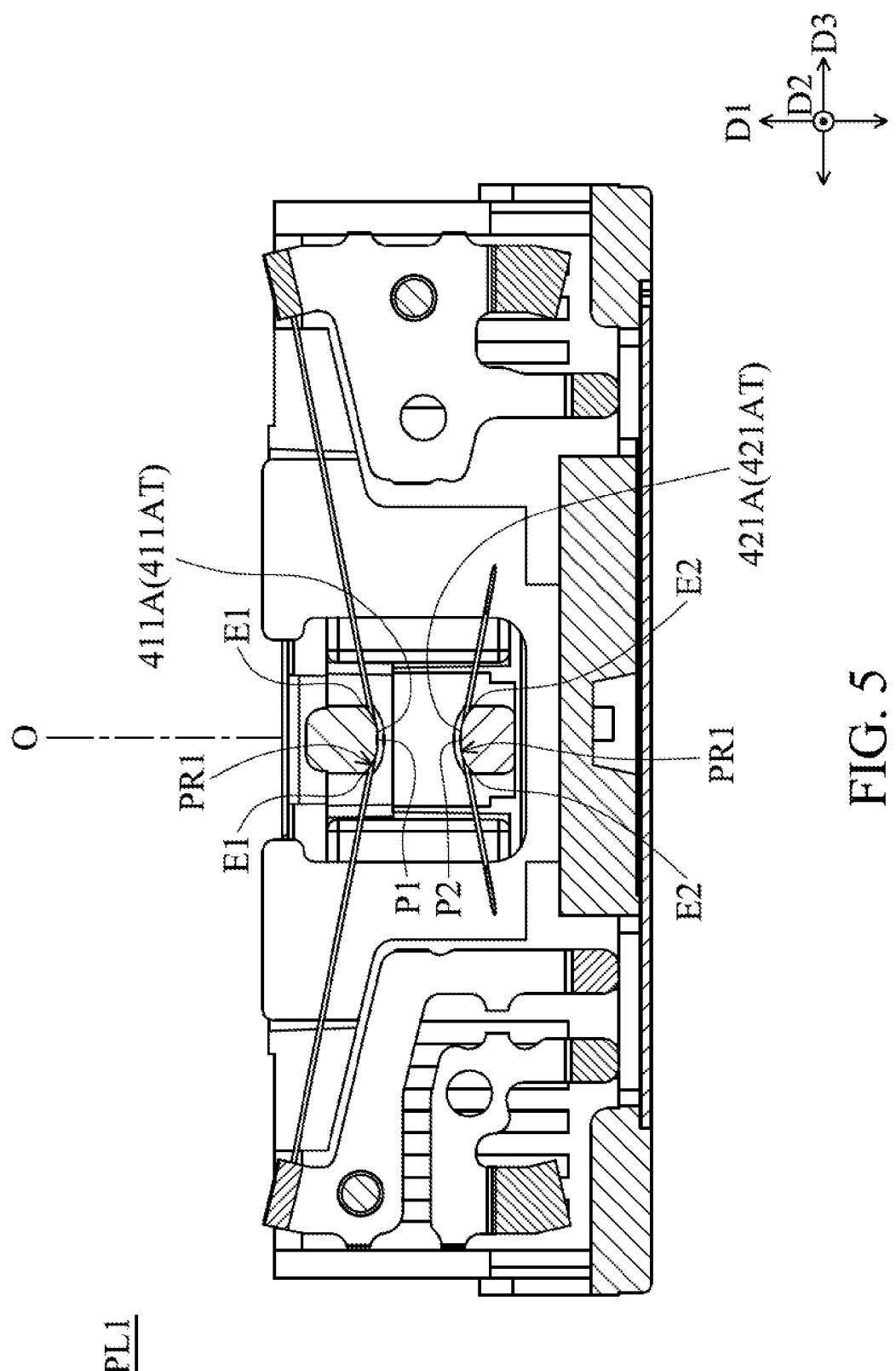
FIG. 5 is a cross-sectional view of the optical element driving mechanism cut along the line A-A in FIG. 3.
Figure 6:
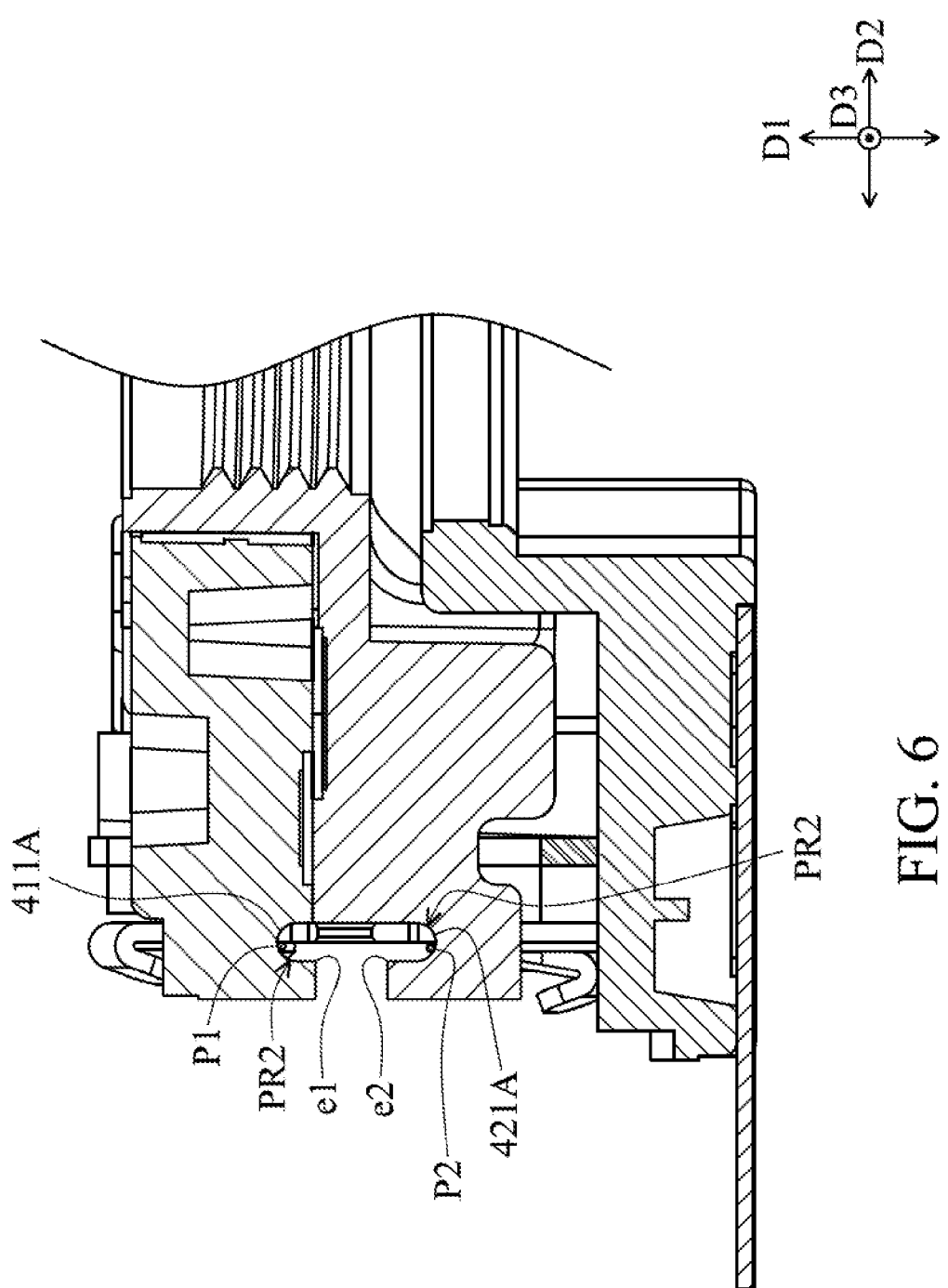
FIG. 6 is a cross-sectional view of the optical element driving mechanism cut along the line B-B in FIG. 3.

Next, refer to FIG. 3, FIG. 5, and FIG. 6, FIG. 5 is a cross-sectional view of the optical element driving mechanism 1 cut along the line A-A in FIG. 3, and FIG. 6 is a cross-sectional view of the optical element driving mechanism 1 cut along the line B-B in FIG. 3. As shown in FIG. 3, the first hook-shaped structure 411 has a first inner surface 411A, the second hook-shaped structure has a second inner surface 421A, and the first inner surface 411A and the second inner surface 421A are faced to each other. As shown in FIG. 5, the driving assembly 300 is in contact with the first inner surface 411A at at least one contact point P1, and the driving assembly 300 is in contact with the second inner surface 421A at at least one contact point P2.

When the first hook-shaped structure 411 is cut with a first imaginary plane PL1 and observed, as shown in FIG. 5, a first contour PR1 of the first inner surface 411A is an arc shape protruding toward the second inner surface 421A, and a curvature at the contact point P1 is smaller than a curvature at any one of two side endpoints E1. When the second hook-shaped structure 421 is cut with the first imaginary plane PL1 and observed, a first contour PR1 of the second inner surface 421A is an arc shape protruding toward the first inner surface 411A, and a curvature at the contact point P2 is smaller than a curvature at any one of two side endpoints E2. The first imaginary plane PL1 is perpendicular to the second direction D2, and passes through the contact point P1 of the first inner surface 411A and the contact point P2 of the second inner surface 421A.

When the first hook-shaped structure 411 is cut and observed with a second imaginary plane PL2 that is perpendicular to the third direction D3 and passes through the contact point P1 of the first inner surface 411A and the contact point P2 of the second inner surface 421A, as shown in FIG. 6, a second profile PR2 of the first inner surface 411A is an arc shape that is concave away from the second inner surface 421A, and a curvature at the contact point P1 is greater than or equal to a curvature at an outer endpoint e1. When the second hook-shaped structure 421 is cut with the second imaginary plane PL2 and observed, a second contour PR2 of the second inner surface 421A is an arc shape that is concave away from the first inner surface 411A, and a curvature at the contact point P2 is greater than or is equal to a curvature at an outer endpoint e2.

As can be seen from the above, in this embodiment, by setting the first inner surface 411A and the second inner surface 421A as curved surfaces with almost no angle, which may not only reduce the contact with the driving assembly 300 to avoid the heat dissipation of the driving assembly 300, but also prevent the driving assembly 300 from being worn by contacting angular structures when moving.

However, in some embodiments, a first contact surface 411AT is formed by flattening a part of the first inner surface 411A that is arc-shaped, as shown in FIG. 5, and the first contact surface 411AT is a plane. A second contact surface 421AT is formed by flattening a part of the second inner surface 421A that is arc-shape, and the second contact surface 421AT is a plane. A size of the first contact surface 411AT in the third direction D3 is smaller than a size of the first hook-shaped structure 411 in the third direction D3, and a size of the second contact surface 421AT in the third direction D3 is smaller than a size of the second hook-shaped structure 421 in the third direction D3.

In more detail, by forming the first contact surface 411AT and the second contact surface 421AT, a contact between the driving assembly 300 and the first limiting element 410 (or the second limiting element 420) is changed from point contact to surface contact. Compared with point contact, the first contact surface 411AT and the second contact surface 421AT may serve as a more stable fulcrum of the driving assembly 300, so that the movement of the driving assembly 300 may be more precisely controlled, and thus the movement of the movable portion 200 may be precisely controlled.

In addition, the size in the third direction D3 of the first contact surface 411AT and the second contact surface 421AT are set to be as small as possible, so that the first contact surface 411AT and the second contact surface 421AT are still to be a fulcrum, and the contact with the driving assembly 300 may be reduced to avoid heat dissipation of the assembly 300.

Next, referring to FIG. 2 to FIG. 4 and FIG. 7, FIG. 7 is a side view of partial elements of the optical element driving mechanism 1 according to an embodiment of the present disclosure. It should be noted that, in order to clearly show arrangement relationships between elements, the outer cover 110 is omitted in FIG. 7, and the base 120 is presented to be transparent by a dashed line. The circuit assembly 500 is disposed on the first blocking wall 121 of the first side S1 of the fixed portion 100, comprising a first circuit element 510, a second circuit element 520, and a third circuit element 530. As shown in FIG. 4, the first circuit element 510 and the second circuit element 520 are disposed on a side relative to the limiting assembly 400, and the third circuit element 530 is disposed on the other side relative to the limiting assembly 400.

When viewed along the first direction D1, the first circuit element 510 and the second circuit element 520 at least partially overlap, the first circuit element 510 and the third circuit element 530 do not overlap, and the second circuit element 520 and the third circuit element 530 do not overlap. When viewed along the second direction D2, the first circuit element 510, the second circuit element 520, and the third circuit element 530 do not overlap. When viewed along the third direction D3, the first circuit element 510, the second circuit element 520, and the third circuit element 530 at least partially overlap.

The first circuit element 510 has a first end portion 511, an outer curved portion 512, and a hole portion 513. The second circuit element 520 has a second end portion 521, an outer curved portion 522, a hole portion 523, and a stepped portion 524. The third circuit element 530 has a third end portion 531, a first outer curved portion 532A, a second outer curved portion 532B, two hole portions 533, and a stepped portion 534. It should be noted that a number of the step portion and the hole portion is only an example and not a limitation, and the number may be increased or decreased as required.

Figure 7:
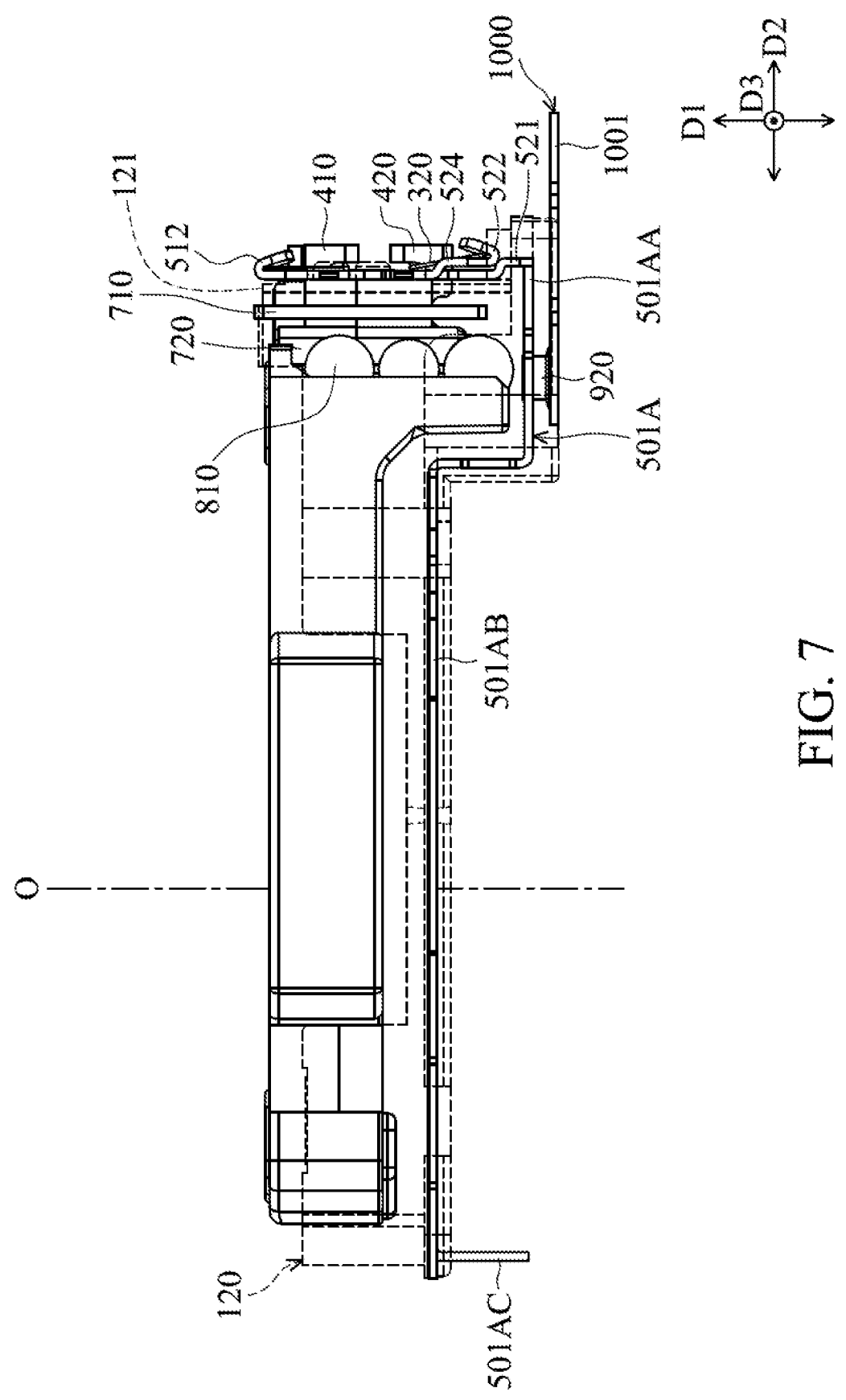
FIG. 7 is a side view of partial elements of the optical element driving mechanism according to an embodiment of the present disclosure.

When viewed along the third direction D3, the first end portion 511, the second end portion 521, and the third end portion 531 at least partially overlap. The first end portion 511, the second end portion 521, and the third end portion 531 are connected to the driving circuit assembly 500A. As shown in FIG. 2 and FIG. 7, the driving circuit assembly 500A is disposed on the fixed portion 100. In some embodiments, the driving circuit assembly 500A is embedded in the base 120, and comprises a first input circuit element 501A, a second input circuit element 502A, and an output circuit element 503A. The first end portion 511, the second end portion 521, and the third end portion 531 are respectively connected to the first input circuit element 501A, the second input circuit element 502A, and the output circuit element 503A.

The first input circuit element 501A has a first connection portion 501AA, a first extension portion 501AB, and a first external connection portion 501AC, and the first extension portion 501AB is connected to the first connection portion 501AA and the first external connection portion 501AC. The first connection portion 501AA is connected to the first end portion 511. The first external connection portion 501AC protrudes from the second side S2 of the fixed portion 100 to be connected to an external driving power source (not shown).

The second input circuit element 502A has a second connection portion 502AA, a second extension portion 502AB, and a second external connection portion 502AC, and the second extension portion 502AB is connected to the second connection portion 502AA and the second external connection portion 502AC. The second connection portion 502AA is connected to the second end portion 521. The second external connection portion 502AC protrudes from the second side S2 to be connected to the external driving power source.

The output circuit element 503A has a third connection portion 503AA, a third extension portion 503AB, and a third external connection portion 503AC, and the third extension portion 503AB is connected to the third connection portion 503AA and the third external connection portion 503AC. The third connection portion 503AA is connected to the third end portion 531. The third external connection portion 503AC protrudes from the second side S2 and is connected to the external driving power source.

As shown in FIG. 3 and FIG. 4, the outer curved portion 512, the outer curved portion 522, the first outer curved portion 532A, and the second outer curved portion 532B are all curved outward away from the optical axis O, and connected to the driving assembly 300. In more detail, one end of the first driving element 310 is connected to the outer curved portion 512 of the first circuit element 510, and the other end of the first driving element 310 is connected to the first outer curved portion 532A of the third circuit element 530 through the first limiting element 410. One end of the second driving element 320 is connected to the second circuit element 520, and the other end of the second driving element 320 is connected to the second outer curved portion 532B of the third circuit element 530 through the second limiting element 420.

When viewed along the second direction D2, the outer curved portion 512 of the first circuit element 510 and the first outer curved portion 532A of the third circuit element 530 are symmetrically arranged, and the outer curved portion 522 of the second circuit element 520 and the second outer curved portions 532B of the third circuit element 530 are symmetrically arranged. The first end portion 511, the second end portion 521, and the third end portion 531 are disposed between the outer curved portion 522 of the second circuit element 520 and the second outer curved portion 532B of the third circuit element 530.

As shown in FIG. 7, when viewed along the third direction D3, the outer curved portion 522 of the second circuit element 520 is further away from the optical axis O than the outer curved portion 512 of the first circuit element 510, the second outer curved portion 532B of the third circuit element 530 is further away from the optical axis O than the first outer curved portion 532A of the third circuit element 530.

When viewed along the third direction D3, the outer curved portion 522 of the second circuit element 520 does not overlap with the first end portion 511 and the second end portion 521, and the second outer curved portion 532B of the third circuit element 530 does not overlap with the third end portion 531.

In more detail, by respectively providing the stepped portion 524 and stepped portion 534 in the second circuit element 520 and the third circuit element 530, the outer curved portion 512 and the second outer curved portion 532B are lifted away from the first blocking wall 121. In this way, the second driving element 320 may not contact the first end portion 511, the second end portion 521 and the third end portion 531. Therefore, a short circuit may be avoided, and the probability of the second driving element 320 being worn due to contact with the circuit assembly 500 may be reduced.

As shown in FIG. 4, by providing at least one hole portion in the first circuit element 510, the second circuit element 520, and the third circuit element 530, which may not only be able to engage with the positioning posts 121B on the first blocking wall 121 to facilitate subsequent fixing between the base 120 and the circuit assembly 500, but also prevent the circuit assembly 500 made of metal material from dissipating heat too fast. If the circuit assembly 500 dissipates heat too fast, the driving assembly 300 may be difficult to heat, and thus it may be difficult to control the shrinkage of the driving assembly 300.

As shown in FIG. 2 and FIG. 4, the adhesive assembly 600 comprises a first adhesive element 610, a second adhesive element 620, a third adhesive element 630, a fourth adhesive element 640, and an adhesive element 650. The first adhesive element 610, the second adhesive element 620, the third adhesive element 630, and the fourth adhesive element 640 fix the driving assembly 300 to the limiting assembly 400, and the adhesive element 650 fixes the circuit assembly 500 to the fixed portion 100. In some embodiments, the adhesive assembly 600 may be, for example, glue.

The first adhesive element 610 is injected from a first side surface 410S1 of the first limiting element 410 to fix the first driving element 310 and the first limiting element 410. The second adhesive element 620 is injected from a second side surface 410S2 of the first limiting element 410 to fix the first driving element 310 and the first limiting element 410. The first side surface 410S1 of the first limiting element 410 and the second side surface 410S2 of the first limiting element 410 are opposite to each other, and are connected to the first inner surface 411A.

The third adhesive element 630 is injected from a first side surface 420S1 of the second limiting element 420 to fix the second driving element 320 and the second limiting element 420. The fourth adhesive element 640 is injected from the second side surface 420S2 of the second limiting element 420 to fix the second driving element 320 and the second limiting element 420. The first side surface 420S1 of the second limiting element 420 and the second side surface 420S2 of the second limiting element 420 are opposite to each other, and are connected to the second inner surface 421A.

In more detail, in this embodiment, by injecting adhesive elements in the vicinity of the first side surfaces 410S1, 420S1, the second side surfaces 410S2, 420S2, and the inner surfaces 411A, 421A, which may make the driving assembly

300 be fixed to the two sides of the limiting assembly 400. In addition, the first adhesive element 610, the second adhesive element 620, the third adhesive element 630, and the fourth adhesive element 640 may fill gaps between the driving assembly 300 and the limiting assembly 400, so that the driving assembly 300 is less likely to be worn by contacting the side surfaces and the inner surfaces of the limiting assembly 400 when the driving assembly 300 is driven.

As mentioned above, the first blocking wall 121 of the base 120 is provided with a plurality of groove structures 121C, and the adhesive element 650 fixes the first circuit element 510, the second circuit element 520, and the third circuit element 530 on the groove structure 121C. In more detail, since the groove structure 121C has a larger adhesive area than the flat surface, the adhesive between the circuit assembly 500 and the fixed portion 100 may be more stable.

As shown in FIG. 2 and FIG. 7, the magnetic assembly 700 comprises a magnetically permeable element 710 and two magnetic elements 720. The magnetically permeable element 710 may comprise a metal material or any material that is magnetically permeable. In this embodiment, the magnetically permeable element 710 is a U-shaped plate structure, and is disposed on the accommodating portion 121A of the first blocking wall 121. The U-shaped part is allowed the protruding portion 201 of the movable portion 200 to pass through. Two magnetic elements 720 are disposed on the movable portion 200.

The guiding assembly 800 is movably disposed between the movable portion 100 and the fixed portion 200 to guide a relative movement between the movable portion 100 and the fixed portion 200. In this embodiment, the guiding assembly 800 comprises a ball group 810 and a ball group 820, and the ball group 810 and the ball group 820 are respectively disposed on both sides between the first blocking wall 121 and the movable portion 200. The ball group 810 and the ball group 820 are respectively composed of three balls arranged along the first direction.

By a force between the magnetically permeable element 710 and the magnetic elements 720, the movable portion 200 is approached the first blocking wall 121, and thus the guiding assembly 800 may be closely contacted with the movable portion 200 and the first blocking wall 121 of the fixed portion 100. Therefore, when the driving assembly 300 drives the movable portion 200 to move, the movable portion 200 may move in the first direction D1 along the guiding assembly 800 more stably.

The position sensing element 900 senses a movement of the movable portion 200 relative to the fixed portion 100, and comprises a reference element 910 and a position sensing element 920. In this embodiment, the two magnetic elements 720 disposed on the movable portion 200 serve as the reference element 910 at the same time. The position sensing element 920 is disposed on the fixed portion 100 and connected to the sensing circuit assembly 1000.

The sensing circuit assembly 1000 is disposed on the base 120 of the fixed portion 100, and comprises a plurality of circuit elements 1001. In some embodiments, the sensing circuit assembly 1000 may be a flexible printed circuit board, and the plurality of circuit elements 1001 protruding from the first side S1 of the fixed portion 100 are connected to an external power source (not shown).

Therefore, with the above configuration, the sensing circuit and the driving circuit are respectively connected to the external power supply through different sides (the first side S1 and the second side S2) of the fixed portion 100, which may more effectively utilize the space in the fixed portion 100, thereby achieving overall miniaturization of the optical element driving mechanism 1.

As described above, the present disclosure provides an optical element driving mechanism, comprising a fixed portion, a movable portion, a driving assembly, and a limiting assembly, the limiting assembly is disposed on the movable portion and connected with the driving assembly, and the driving assembly is limited to move within a movable range by the limiting assembly. The special position and size relationship of each element disclosed in the present invention may enable the optical element driving mechanism to achieve a specific direction of thinning and overall miniaturization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to comprise within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed portion;
a movable portion, connected to an optical element with an optical axis, movable relative to the fixed portion;
a driving assembly, driving the movable portion to move relative to the fixed portion;
a limiting assembly, disposed on the movable portion and connected with the driving assembly, wherein the driving assembly is limited to move within a movable range relative to the fixed portion by the limiting assembly; and
an adhesive assembly, comprising a first adhesive element, a second adhesive element, a third adhesive element, and a fourth adhesive element,
wherein the limiting assembly comprises a first limiting element and a second limiting element,
wherein when viewed along a first direction parallel to the optical axis, the first limiting element and the second limiting element at least partially overlap,
wherein when viewed along a second direction perpendicular to the first direction, the first limiting element and the second limiting element are symmetrically arranged,
wherein when viewed along a third direction perpendicular to the first direction and the second direction, the first limiting element and the second limiting element do not overlap,
wherein the driving assembly comprises a first driving element and a second driving element, the first driving element and the second driving element have a shape memory alloy, and the first driving element and the second driving element are elongated structures, wherein two ends of the first driving element are connected to the fixed portion, the first driving element is in contact with the first limiting element and is limited to move by the first limiting element, two ends of the second driving element are connected to the fixed portion, and the second driving element is in contact with the second limiting element and is limited to move by the second limiting element,
wherein when viewed along the second direction, the first driving element and the second driving element do not overlap over the entirety of the lengths of the first driving element and the second driving element;
wherein the first adhesive element is injected from a first side of the first limiting element to fix the first driving element and the first limiting element,
wherein the second adhesive element is injected from a second side of the first limiting element to fix the first driving element and the first limiting element, wherein the first side of the first limiting element and the second side of the first limiting element are opposite to each other,
wherein the third adhesive element is injected from a first side of the second limiting element to fix the second driving element and the second limiting element,
wherein the fourth adhesive element is injected from a second side of the second limiting element to fix the second driving element and the second limiting element, wherein the first side of the second limiting element and the second side of the second limiting element are opposite to each other.

2. The optical element driving mechanism as claimed in claim 1, wherein the first limiting element and the second limiting element respectively have a first hook-shaped structure and a second hook-shaped structure,
wherein the first hook-shaped structure extends along the second direction and away from the optical axis, and then extends along the first direction and away from a light incident surface,
wherein the second hook-shaped structure extends along the second direction and away from the optical axis, and then extends along the first direction and close to the light incident surface,
wherein the first hook-shaped structure and the second hook-shaped structure are faced to each other.

3. The optical element driving mechanism as claimed in claim 2, wherein the first hook-shaped structure has a first inner surface, the second hook-shaped structure has a second inner surface, and the first inner surface and the second inner surface are faced to each other,
wherein the driving element is in contact with the first inner surface at at least one contact point, and the driving element is in contact with the second inner surface at at least one contact point,
wherein when the first hook-shaped structure is cut with a first imaginary plane and observed, a first contour of the first inner surface is an arc shape protruding toward the second inner surface, and a curvature at the contact point is smaller than a curvature at any one of two side endpoints,
wherein when the second hook-shaped structure is cut with the first imaginary plane and observed, a first contour of the second inner surface is an arc shape protruding toward the first inner surface, and a curvature at the contact point is smaller than a curvature at any one of two side endpoints, wherein the first imaginary plane is perpendicular to the second direction and passes through the contact point of the first inner surface and the contact point of the second inner surface.

4. The optical element driving mechanism as claimed in claim 3, wherein a part of the first inner surface is a first contact surface, and the first contact surface is a plane, wherein a part of the second inner surface is a second contact surface, and the second contact surface is a plane, wherein the driving assembly is in contact with the first contact surface, and the driving assembly is in contact with the second contact surface.

5. The optical element driving mechanism as claimed in claim 3, wherein when the first hook-shaped structure is cut with a second imaginary plane and observed, a second contour of the first inner surface is an arc shape that is concave away from the second inner surface, and a curvature at the contact point is greater than or equal to a curvature at an outer endpoint, wherein when the second hook-shaped structure is cut with the second imaginary plane and observed, a second contour of the second inner surface is an arc shape that is concave away from the first inner surface, and a curvature at the contact point is greater than or is equal to a curvature at an outer endpoint, wherein the second imaginary plane is perpendicular to the third direction and passes through the contact point of the first inner surface and the contact point of the second inner surface.

6. The optical element driving mechanism as claimed in claim 1, further comprising a circuit assembly, disposed on a first side of the fixed portion, comprising a first circuit element, a second circuit element, and a third circuit element, wherein when viewed along the first direction:

the first circuit element and the second circuit element at least partially overlap;

the first circuit element and the third circuit element do not overlap;

the second circuit element and the third circuit element do not overlap, wherein when viewed along the second direction, the first circuit element, the second circuit element, and the third circuit element do not overlap, wherein when viewed along the third direction, the first circuit element, the second circuit element, and the third circuit element at least partially overlap.

7. The optical element driving mechanism as claimed in claim 6, wherein the first circuit element has a first end portion, the second circuit element has a second end portion, and the third circuit element has a third end portion, wherein when viewed along the third direction, the first end portion, the second end portion, and the third end portion at least partially overlap wherein the first end portion, the second end portion, and the third end portion are connected to a driving circuit assembly.

8. The optical element driving mechanism as claimed in claim 7, wherein the first circuit element further has an outer curved portion, the second circuit element further has an outer curved portion, and the third circuit element further has a first outer curved portion and a second outer curved portion, wherein the outer curved portion of the first circuit element, the outer curved portion of the second circuit element, and the first outer curved portion and the second outer curved portion of the third circuit element are all curved outward away from the optical axis, wherein when viewed along the second direction, the outer curved portion of the first circuit element and the first outer curved portion of the third circuit element are symmetrically disposed, and the outer curved portion of the second circuit element and the second outer curved portion of the third circuit element are symmetrically disposed.

9. The optical element driving mechanism of claim 8, wherein when viewed along the third direction, the outer curved portion of the second circuit element is further away from the optical axis than the outer curved portion of the first circuit element, and the second outer curved portion of the third circuit element is further away from the optical axis than the first outer curved portion of the third circuit element.

10. The optical element driving mechanism as claimed in claim 9, wherein when viewed along the third direction, the outer curved portion of the second circuit element does not overlap the first end portion and the second end portion, and the second outer curved portion of the third circuit element does not overlap the third end portion.

11. The optical element driving mechanism as claimed in claim 8, wherein when viewed along the first direction, the first driving element and the second driving element at least partially overlap, wherein when viewed along the third direction, the first driving element and the second driving element do not overlap, wherein one end of the first driving element is connected to the outer curved portion of the first circuit element, and the other end is connected to the first outer curved portion of the third circuit element through the first limiting element, wherein one end of the second driving element is connected to the second circuit element, and the other end is connected to the second outer curved portion of the third circuit element through the second limiting element.

12. The optical element driving mechanism as claimed in claim 7, wherein the driving circuit assembly is disposed on the fixed portion, comprising a first input circuit element, a second input circuit element, and an output circuit element, wherein the first input circuit element has a first connection portion, a first extension portion, and a first external connection portion, the first extension portion is connected to the first connection portion and the first external connection portion, wherein the first connection portion is connected to the first end portion, the first external connection portion protrudes from a second side of the fixed portion and is connected to an external driving power source, wherein the second side and the first side are opposite to each other, wherein the second input circuit element has a second connection portion, a second extension portion, and a second external connection portion, the second extension portion is connected to the second connection portion and the second external connection portions, wherein the second connection portion is connected to the second end portion, the second external connection portion protrudes from the second side and is connected to the external driving power source, wherein the output circuit element has a third connection portion, a third extension portion, and a third external connection portion, the third extension portion is connected to the third connection portion and the third external connection portion, wherein the third connection portion is connected to the third end portion, the third external connection portion protrudes from the second side and is connected to the external driving power source.

13. The optical element driving mechanism as claimed in claim 6, wherein the optical element driving mechanism further comprises a position sensing assembly, sensing a movement of the movable portion relative to the fixed portion, comprising:

a reference element, disposed on the movable portion; and a position sensing element, disposed on the fixed portion and connected to a sensing circuit assembly, wherein the sensing circuit is disposed on the fixed portion and comprises a plurality of circuit elements, and the circuit elements protrude from the first side of the fixed portion and are connected to an external power source.

14. The optical element driving mechanism as claimed in claim 6, wherein the first circuit element, the second circuit element, and the third circuit element respectively have at least one hole portion, wherein a plurality of positioning posts are disposed on the first side of the fixed portion, and the hole portions are engaged with the positioning posts.

15. The optical element driving mechanism as claimed in claim 6, wherein the first side of the fixed portion is provided with a plurality of groove structures, wherein the first circuit element, the second circuit element and the third circuit element are fixed on the groove structures by an adhesive element.

16. The optical element driving mechanism as claimed in claim 1, wherein the movable portion is formed by a combination of a first part and a second part.

17. The optical element driving mechanism as claimed in claim 16, wherein the first limiting element is integrally formed with the first part, and the second limiting element is integrally formed with the second part.

18. The optical element driving mechanism as claimed in claim 1, wherein the limiting assembly is made of non-metallic material.

*    *    *    *    *